US007126617B2

(12) United States Patent
Yamamoto et al.

(10) Patent No.: US 7,126,617 B2
(45) Date of Patent: Oct. 24, 2006

(54) METHOD OF DRIVING DISPLAY APPARATUS AND PLASMA DISPLAY APPARATUS

(75) Inventors: Akira Yamamoto, Kawasaki (JP); Hirohito Kuriyama, Kawasaki (JP); Ayahito Kojima, Kawasaki (JP); Kosaku Toda, Kawasaki (JP)

(73) Assignee: Fujitsu Hitachi Plasma Display Limited, Kawasaki (JP)

(*) Notice: Subject to any disclaimer, the term of this patent is extended or adjusted under 35 U.S.C. 154(b) by 56 days.

(21) Appl. No.: 09/985,780

(22) Filed: Nov. 6, 2001

(65) Prior Publication Data

US 2002/0097201 A1 Jul. 25, 2002

(30) Foreign Application Priority Data

Jan. 25, 2001 (JP) ............................ 2001-017471

(51) Int. Cl.
*G09G 5/10* (2006.01)
*G09G 3/10* (2006.01)
*G09G 5/00* (2006.01)
*H04N 5/14* (2006.01)

(52) U.S. Cl. ...................... 345/690; 345/208; 345/211; 315/169.1; 348/671

(58) Field of Classification Search ............ 345/60–68, 345/204, 212, 213, 87, 89, 99, 690–693; 315/169.1–169.4; 348/671
See application file for complete search history.

(56) References Cited

U.S. PATENT DOCUMENTS

| | | | | |
|---|---|---|---|---|
| 5,818,419 | A * | 10/1998 | Tajima et al. | 345/691 |
| 5,969,710 | A * | 10/1999 | Doherty et al. | 345/693 |
| 5,973,655 | A * | 10/1999 | Fujisaki et al. | 345/63 |
| 6,052,112 | A * | 4/2000 | Tanaka et al. | 345/596 |
| 6,088,012 | A * | 7/2000 | Shigeta et al. | 345/63 |
| 6,097,358 | A * | 8/2000 | Hirakawa et al. | 345/63 |
| 6,144,364 | A | 11/2000 | Otobe et al. | |
| 6,249,265 | B1 | 6/2001 | Tajima et al. | |
| 6,323,880 | B1 * | 11/2001 | Yamada | 345/690 |
| 6,369,782 | B1 * | 4/2002 | Shigeta | 345/63 |

(Continued)

FOREIGN PATENT DOCUMENTS

EP 0774745 5/1997

(Continued)

OTHER PUBLICATIONS

European Search Report, issued Oct. 19, 2005, for related European Patent Application No. 01309476.8—2205 PCT.

(Continued)

*Primary Examiner*—Henry N. Tran
(74) *Attorney, Agent, or Firm*—Staas & Halsey LLP

(57) ABSTRACT

The method of driving a display apparatus, in which the gradation scale is represented, by the subfield method, with less flicker even when driven at a frequency of 50 Hz has been disclosed. In this method, the two most weighted subfields (subfields of Bn brightness and Bn−1 brightness when it is assumed that the frame is composed of n subfields and the brightness of n subfields is Bi (i=1−n; B1≦B2 . . . Bn−1≦Bn)) are arranged at the interval of about half the length of the frame. Because of this, there exist two peaks of the light emission intensity in a frame, the interval being about half the length of the frame, and if the display apparatus is driven at a frequency of 50 Hz and the length of the frame is 20 ms, the variation period of the light emission intensity is 10 ms and the light emission intensity varies at 100 Hz, therefore, flicker is not detected.

14 Claims, 19 Drawing Sheets

U.S. PATENT DOCUMENTS

| | | | | |
|---|---|---|---|---|
| 6,433,763 | B1 * | 8/2002 | Lim et al. | 345/68 |
| 6,448,960 | B1 * | 9/2002 | Shigeta | 345/204 |
| 6,466,187 | B1 * | 10/2002 | Moon | 345/63 |
| 6,552,701 | B1 * | 4/2003 | Tanaka | 345/63 |
| 6,714,250 | B1 | 3/2004 | Correa et al. | |

FOREIGN PATENT DOCUMENTS

| | | |
|---|---|---|
| EP | 0982707 | 3/2000 |
| JP | 3-145691 | 6/1991 |
| JP | 5-127612 | 5/1993 |
| JP | 7-271325 | 10/1995 |
| JP | 10-31455 | 2/1998 |
| JP | 10-207426 | 9/1998 |
| WO | WO 01/29812 | 4/2001 |

OTHER PUBLICATIONS

European Search Report, dated Feb. 16, 2006, for related European Patent Application No. EP 01 30 9476.

* cited by examiner

METHOD OF DRIVING DISPLAY APPARATUS AND PLASMA DISPLAY APPARATUS

BACKGROUND OF THE INVENTION

The present invention relates to a method of driving a display apparatus in which the gradation scale is represented by a subfield structure. More particularly, the present invention relates to a method of driving a display apparatus such as a plasma display in which each subfield has at least an address period and a light period.

Description is made below with an example of a plasma display (simply referred to as a PDP hereinafter). The present invention, however, is not limited to a PDP but applicable to any type of display apparatus as long as the gradation scale is represented by a subfield structure and each subfield has at least an address period and a light period.

Since information about a PDP has been disclosed in, for example, Japanese Unexamined Patent Publication (Kokai) No. 7-271325, a detailed description is omitted here and only an outline of the structure and the driving method is given.

FIG. 1 is a block diagram that shows a structure of a display apparatus that uses a three-electrode type PDP 101. Address electrodes A1, . . . , Am of the PDP 101 are connected to an address driver 105, respectively, and address pulses are applied in the address period by the address driver 105. Y electrodes Y1, Y2, . . . , Yn are connected to a Y scan driver 102, respectively. A Y common driver 103 is connected to the Y scan driver 102. The Y scan driver 102 applies generated address pulses to the Y electrodes sequentially in the address period, and in the sustain discharge period, applies the sustain pulses generated in the Y common driver 103 to the Y electrodes in common. X electrodes are connected in common to all the display lines of the panel and sustain pulses are applied in common in the sustain period by an X common driver 104. These driver circuits are controlled by a control circuit 106. The control circuit 106 comprises a display data control portion 107 and a panel drive control portion 109. The display data control portion 107 expands the display data supplied from the outside on a frame memory 108, converts it into the data for the subfield structure to represent the gradation scale of PDP, and outputs it to the address driver 105. The panel drive control portion 109 generates control signals using the vertical sync. signals (VSYNC) and the horizontal synch. signals (HSYNC) and applies them to each portion.

FIG. 2 is a diagram that shows an example of drive waveforms of a PDP. These waveforms represent a subfield in the so-called "address/sustain period separated type-write address method." In this example, a subfield comprises a reset period, an address period, and a sustain discharge period.

In the reset period, first, all the Y electrodes are set to 0 V level, and at the same time entire surface write pulses of Vs+Vw voltage are applied to the X electrodes, pulses of Vaw voltage are applied to the address electrodes and, thus, the reset discharge is caused to occur in all the cells regardless of the previous display conditions. Subsequently, the potential of the X electrodes and the address electrodes becomes 0 V, and discharge is caused to occur in all the cells because the voltage of the wall charges themselves exceeds the discharge start voltage. Because there is no difference in potential between electrodes, no wall charges are generated by these discharges, and the discharges end with the self-neutralization of space charges. This discharge is the so-called self-neutralization discharge. By this self-neutralization discharge, all the cells reach a uniform state without wall charges. This reset period acts so that all the cells reach an identical state regardless of the lighting conditions in the previous subfield, and contributes to the stable address discharge that follows.

In the next address period, address discharges are caused to occur line-sequentially in order to set each cell to a state in correspondence with the display data. First, scan pulses of −VY are applied to the Y electrodes and, in synchronization with this, address pulses of Va voltage are applied selectively to the address electrodes that correspond to the cells that will carry out sustain discharges, that is, those to be lit, in the address electrodes, then discharges are caused to occur between the address electrode and the Y electrode of the cell to be lit, and this serves as the priming (pilot) to cause discharge to occur immediately between the X electrode and the Y electrode. The former discharge is called "priming address discharge" and the latter, "main address discharge." This causes the wall charges sufficient for the sustain discharge to accumulate on the X electrode and the Y electrode of the selected cell on the selected line.

Similar operations are carried out sequentially on the other display lines and the display data is written to the entire display lines.

In the next sustain discharge period, the sustain discharge pulses of Vs voltage (about 180 V) are applied to the X electrodes and the Y electrodes in turn to cause the sustain discharge to occur and the image display of a subfield is attained. In this "address/sustain period separated type-write address method," the brightness of each subfield is determined by the number of sustain pulses to be applied in the sustain period, that is, the length of the sustain period.

The drive waveforms in FIG. 2 are only examples, and there are various other methods. For example, there is a method in which a pulse that changes gradually is applied to decrease the light emission due to the reset discharge so that the display contrast is improved, or another method in which wall charges are left uniformly in the reset period and address discharge is caused to occur in the cell that is not lit in the address period, and so on.

In the display apparatus that uses a PDP, a frame is composed of plural subfields and the subfields to be lit are combined for each cell to represent the gradation scale. FIG. 3 shows an example in which a frame is composed of the eight subfields SF1 through SF8. Each subfield comprises the reset period, the address period, and the sustain discharge period, respectively. There can be a case in which a difference appears in the total between the period of the display data supplied from the outside and that of all the subfields, and in such a case, a rest period is provided in the frame. For example, there are two methods for TV display, that is, the Vsync frequency can be 60 Hz or 50 Hz. If the plasma display apparatus is manufactured for 60 Hz and when the apparatus is used at 50 Hz, a rest period is provided to adjust the period of a frame. In this rest period, no display operation is performed and the length of the rest period is determined in accordance with the display data supplied from the outside. It may be a case where the length remains constant after being determined once, but there can be another case where the total number of pulses, that is, the sum of sustain pulses in all the cells in a frame, is controlled for power control, or another case where the number of the sustain pulses is adjusted in order to keep the brightness ratio among subfields constant regardless of the display load of each subfield, and so on, in other words, when the sustain period (light period) is varied, the length of the rest period is varied according to the display data. As described later, there may be a case where a reset period is not provided to some subfields to improve the display contrast or to abbreviate the reset period.

The brightness ratio among subfields is typically set to, for example, 1: 2: 4: 8: . . . , where each term is a power of 2, and this brightness ratio has advantages in that the largest number of levels of the gradation scale can be attained with a small number of subfields. For example, if there are four subfields, 16 levels of the gradation scale from 0 through 15 are available, if there are six subfields, 64 levels of the gradation scale from 0 through 63, and if there are eight subfields, 256 levels, from 0 through 255, are available.

When the gradation scale is attained by the subfield method in a display apparatus of "address/sustain period separated type-write address method", the sustain periods where light emission takes place are separate from each other because an address period exists in each subfield, and a problem of the degradation of display quality such as flicker and color false contour is caused depending on the displayed image, because the lengths of the sustain periods are not equal. In Japanese Unexamined Patent Publication (Kokai) No. 3-145691, an art to suppress flicker has been disclosed, in which the most brightness-weighted subfield is arranged in the center and other subfields are arranged on both sides in order of brightness weight in the subfield structure of a frame, with the above-mentioned brightness ratio, each term of which is set to a power of 2. This art, however, cannot provide a sufficient quality of display.

Therefore, the present applicants have disclosed a driving method in which the disturbance of halftones is suppressed by providing plural subfields having a similar brightness and by combining the subfields to be lit adequately according to the level of the gradation scale.

Generally, it is known that it is a characteristic of human eyes to detect flicker with a frequency lower than 60 Hz. In the NTSC method, the Vsync frequency is 60 Hz, but it is 50 Hz in the PAL/SECAM methods employed in Europe, and so on. In a plasma display, images with a high quality are required even in operations with a frequency of 50 Hz. It was found that flicker is not a problem when the arts disclosed in the above-mentioned Japanese Unexamined Patent Publication (Kokai) No. 3-145691 and Japanese Unexamined Patent Publication (Kokai) No. 7-271325 are applied to the plasma display apparatus using the NTSC method to improve the quality of image, but in the case of the plasma display apparatus using the PAL method, flicker remains a problem even when the above-mentioned arts are applied. These phenomena are described with reference to FIG. 4. In FIG. 4A, the reset period and the address period are shown as a RESET & ADDRESS PERIOD of a single diagonal line cross-hatch although the portion of a single diagonal line cross-hatch designates the address period in FIG. 3A. This representation of FIG. 4A is used in later figures.

FIG. 4A shows an example of a frame structure in which the plural subfields having similar brightness disclosed in Japanese Unexamined Patent Publication No. 7-271325 are provided, and FIG. 4B shows the variation of the light emission intensity in the case of the frame structure in FIG. 4A, when driven at a frequency of 50 Hz. As shown in FIG. 4A, a total of 10 subfields, that is, subfields of 24, 16, 8, and 4 brightness weight in pairs, respectively, and subfields of 2 and 1 brightness weight each, respectively, are provided in the frame structure and they are arranged from both ends to the center in order of brightness weight by turns. As described above, light emission periods are separate from each other, because light is emitted in the sustain period in each subfield. If higher-harmonic waves are removed from the variation of the light emission intensity, the light emission intensity is high at both ends of the frame and low in the vicinity of the center, as shown in FIG. 4B. In the actual operation, these states are repeated, therefore, it is necessary to take the neighboring frames into account. In the neighboring frames also, the intensity is high at both ends, resulting in the light emission intensity being repeated with a frequency of 50 Hz.

FIG. 5 shows the resulting graph of the frequency analysis of the variation of the light emission intensity in the frame structure in FIG. 4. As shown in FIG. 5, the difference between the components of 0 Hz and 50 Hz visible to human eyes is small and the absolute value of the 50 Hz component is large. This means that the human eyes see the flicker of 50 Hz considerably when operating at a frequency of 50 Hz in a frame structure in which subfields are arranged as shown in FIG. 4.

FIG. 6A is a diagram that shows the frame structure disclosed in Japanese Unexamined Patent Publication (Kokai) No. 3-145691, and FIG. 6B is a diagram that shows the variation of the light emission intensity. In this case, the light emission brightness is high in the center and low on both sides of the frame. Therefore, the difference between the components of 0 Hz and 50 Hz is small and the absolute value of the 50 Hz component is large, similarly, resulting in a strong flicker at a frequency of 50 Hz.

As described above, the plasma display apparatus that operates at a frequency of 50 Hz generates a strong flicker and thus a problem in the image quality occurs.

Moreover, as shown in FIG. 3, when the plasma display apparatus is driven by the subfield method, a rest period is provided and the length of the rest period varies when the power is controlled or when the brightness ratio among subfields is maintained constant. As shown in FIG. 3, a rest period is provided at the end of the frame and when the rest period is lengthened, the position of the sustain period, that is the light emission period, of each subfield varies. The frame structure is determined in accordance with the display method, and it may be a case where the image quality is degraded if the position of the sustain period of each subfield varies. For example, when driven at a frequency of 50 Hz, a problem in that the intervals between the sustain periods of each subfield are narrowed, the frequency component of 50 Hz is increased and the image quality is degraded, is caused.

Among various items that relate to the image quality, the above-mentioned flicker and the degradation of the contour in animation are problems relating to the subfield method. The problem of the degradation of the contour in animation, for example, results in the color false contour, in which the contour of a moving part is colored, when animation is shown on the color display apparatus. The art disclosed in Japanese Unexamined Patent Publication No. 7-271325 suppresses the occurrence of color false contour, but if a plasma display apparatus to which this art is applied is driven at a frequency of 50 Hz, the problem of flicker occurs. It is thus found impossible to improve every item relating to the image quality with a limited number of subfields.

SUMMARY OF THE INVENTION

The present invention will solve the above-mentioned problems and the first object is to realize a driving method with less flicker even when the apparatus is driven at a frequency of 50 Hz and the second object is to realize a driving method employing the subfield method that improves many items relating to the image quality.

FIGS. 7A and 7B show the fundamental structure in the first embodiment of the present invention. To realize the above-mentioned objects, in the method of driving a display apparatus in the first embodiment of the present invention, the two most brightness-weighted fields among plural fields are arranged at an interval of about half the length of the frame mentioned above.

As shown in FIG. 7A, since the two most brightness-weighted subfields (subfields that have the brightness Bn and Bn−1 in the case where the frame comprises n subfields and the brightness of each subfield is Bi (i=1−n; B1≦B2 . . . Bn−1≦Bn)) are arranged at the interval about half the length of the frame, there are two peaks of the light emission intensity in a frame and the distance between them is about half the length of the frame, as shown in FIG. 7B. Since the light emission intensity varies similarly in the neighboring frames, the intensity varies with periods of about half the length of a frame. When a display apparatus is driven at a frequency of 50 Hz and the length of a frame is 20 ms, the variation period of the light emission intensity is 10 ms and the light emission intensity varies with a frequency of 100 Hz, therefore, flicker is not detected.

It is recommended that the next two most brightness-weighted subfields (subfields that have the brightness Bn−2 and Bn−3 among n subfields) are also arranged at an interval of about half the length of a frame so that the two subfields are positioned almost at the midpoint between the most brightness-weighted subfields, respectively.

If there are no subfields with the same weight in pairs, it is impossible to arrange the two most weighted subfields at the interval of half the length of the frame. Moreover, if the rest period exists and is continuous as conventionally, it is also impossible to arrange the two most weighted subfields at the interval of half the length of the frame. Even if the interval is not half the length of the frame exactly, however, flicker can be suppressed if the interval is approximately half the length of the frame.

FIG. 8 shows the resulting graph of the frequency analysis of the variation of the light emission intensity when a total of ten subfields, that is, subfields of 24, 16, 8, and 4 brightness weight in pairs, respectively, and subfields of 2 and 1 brightness weight each, respectively, are provided similarly as in the frame structure in FIG. 4, and the two subfields whose brightness weight is 24 are arranged at the interval of about half the length of a frame and the two subfields whose brightness weight is 16 are arranged at the interval of about half the length of a frame so that the two subfields of 16 brightness weight are positioned almost at the midpoint between those of 24 brightness weight subfields. Compared to the frequency analysis result of the frame structure in FIG. 4, it is found that the component at the frequency 50 Hz, which human eyes see as flicker, is reduced.

In the method of driving a display apparatus in the second aspect of the present invention, the rest period is divided into plural rest periods and the divided periods are arranged between plural different subfields. According to the second aspect of the present invention, when the rest period occurs, it is divided into plural periods and arranged in different positions between subfields, therefore, flicker does not increase if the rest period is provided or the rest period is lengthened because the changes in position of the light emission period of each subfield are small and the increase of the component of a low frequency of the variation of the light emission intensity can be reduced.

In order not to change the position of the light emission period of each subfield, it is preferable to divide the rest period so that the number of the divided rest periods is equal to that of the subfields and to provide each subfield with a divided rest period.

Moreover, if a frame is divided into two subframes, that is, a front frame and a rear frame, and one of the two most brightness-weighted subfields is provided in the front frame and the other subfield in the rear frame, and the interval of the start timings of the front frame and the rear frame is fixed, the interval of the two most brightness-weighted subfields is maintained at about half the length of the frame. In this case, it is preferable to provide the two most brightness-weighted subfields at the beginning of the front and the rear frames, respectively.

In the method of driving a display apparatus in the third aspect of the present invention in which the brightness of each subfield is determined by the number of applied pulses to be lit in the light period, the brightness of each subfield is determined by the number of pulses to be lit in the light period and the original clock frequency is varied to generate the execute signal at least either in the address period or the light period when the total number of pulses to be lit in a frame is varied.

According to the third aspect of the present invention, since the original clock frequency is varied, it is possible to vary the number of pulses to be lit without changing the address period and the light period of each subfield and to maintain the relation among the light periods of each subfield constant.

It is preferable to vary only the original clock frequency of the light period to vary only the frequency of the pulse to be lit applied in the light period, when the original clock frequency is varied.

In the method of driving a display apparatus in the fourth aspect of the present invention, plural arrangement orders of plural subfields in a frame are stored in memory according to the types of still image, animations, and so on, and an arrangement order of subfields selected from among the plural arrangement orders stored according to the determined type of the image is used for display.

As described above, it is impossible to improve every item relating to the image quality with a limited number of subfields. According to the fourth aspect of the present invention, images of high quality can be displayed constantly, since the most appropriate arrangement order of subfields is used according to the type of the image.

BRIEF DESCRIPTION OF THE DRAWINGS

The present invention will be more clearly understood from the description as set below, with the reference to the accompanying drawings, wherein.

DESCRIPTION OF THE PREFERRED EMBODIMENTS

Figure 9A:
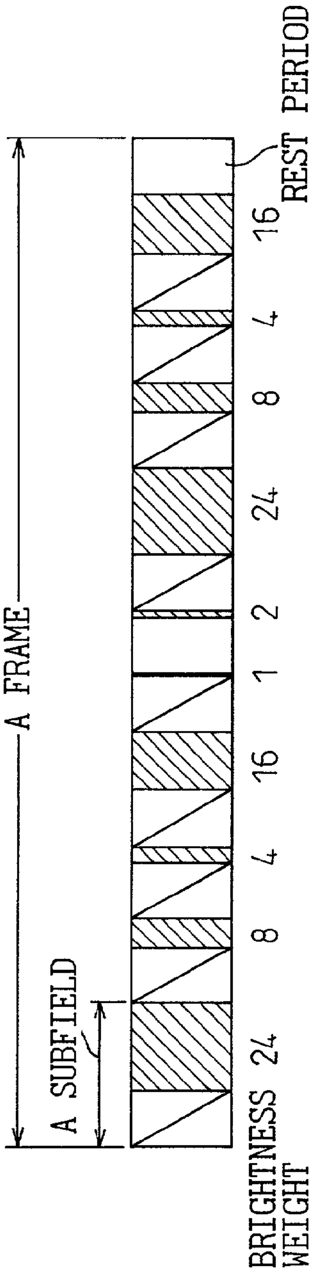
FIG. 9A and FIG. 9B are diagrams that show the frame structure in the first embodiment of the present invention and the variation of the light emission intensity.
Figure 9B:
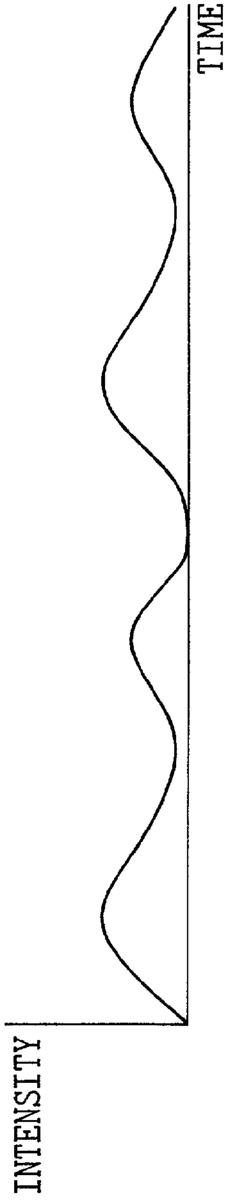

FIG. 9A and FIG. 9B are diagrams that show the frame structure and the variation of the light emission intensity of the method of driving the plasma display apparatus in the first embodiment of the present invention.

As shown in FIG. 9A, in the frame structure in the first embodiment, a total of 10 subfields, that is, subfields of 24, 16, 8, and 4 brightness weight in pairs, respectively, and subfields of 2 and 1 brightness weight each, are provided and arranged in order of brightness weight of 24, 8, 4, 16, 1, 2, 24, 8, 4, and 16. In this example, the rest period is arranged at the end of the frame, the sustain period of the subfield of 24 brightness weight is arranged so that the interval of the sustain period is about half the length of the frame plus the rest period, and the two subfields of 16 brightness weight are arranged at the interval of about half the length of the frame so that each of them is arranged almost at the midpoint between the two subfields of 24 brightness weight. When the rest period is short, it is recommended to arrange either the subfield of 1 brightness weight or that of 2 brightness weight behind the subfield of 16 brightness weight, which is arranged latterly.

FIG. 9B is a diagram that shows the variation of the light emission intensity in the frame structure shown in FIG. 9A. As shown schematically, the two highest peaks are arranged at the interval of about half the frame length and the second highest peaks are arranged between the two highest peaks. Therefore, the two highest peaks appear at about 100 Hz and the four high peaks appear at about 200 Hz.

Figure 10:
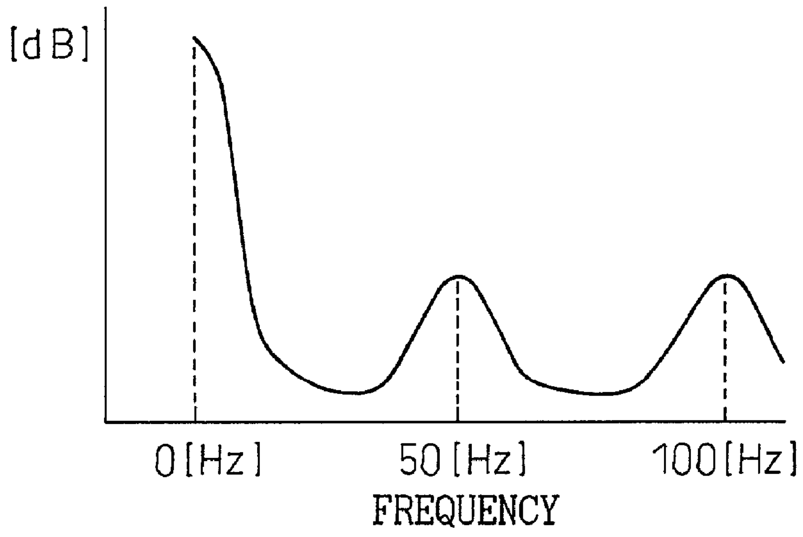
FIG. 10 is a diagram that shows the frequency component of the light emission in the first embodiment.

FIG. 10 shows the result of the frequency analysis of the variation of the light emission intensity in the frame structure in the first embodiment and it is found that the component of 50 Hz is lower than that of 0 Hz, as low as the 100 Hz level.

Figure 6A:
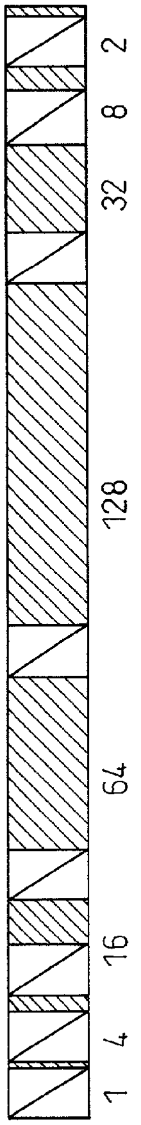
FIG. 6A and FIG. 6B are diagrams that show another conventional frame structure of the plasma display apparatus (PDP apparatus) and the variation of the light emission intensity.
Figure 6B:
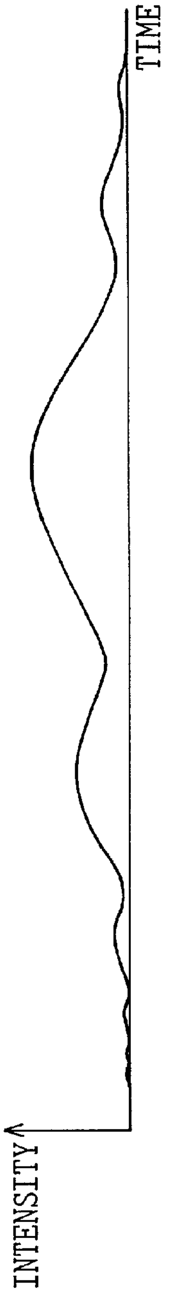
Figure 7A:
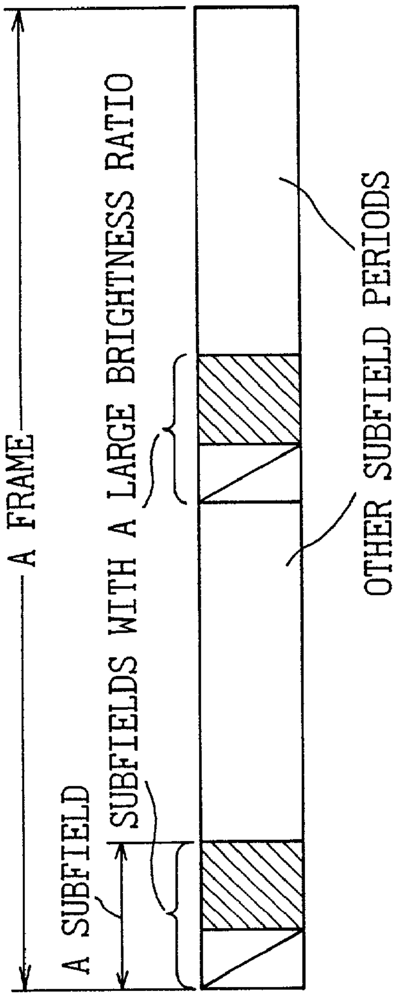
FIG. 7A and FIG. 7B are diagrams that describe the principles of the present invention.
Figure 7B:
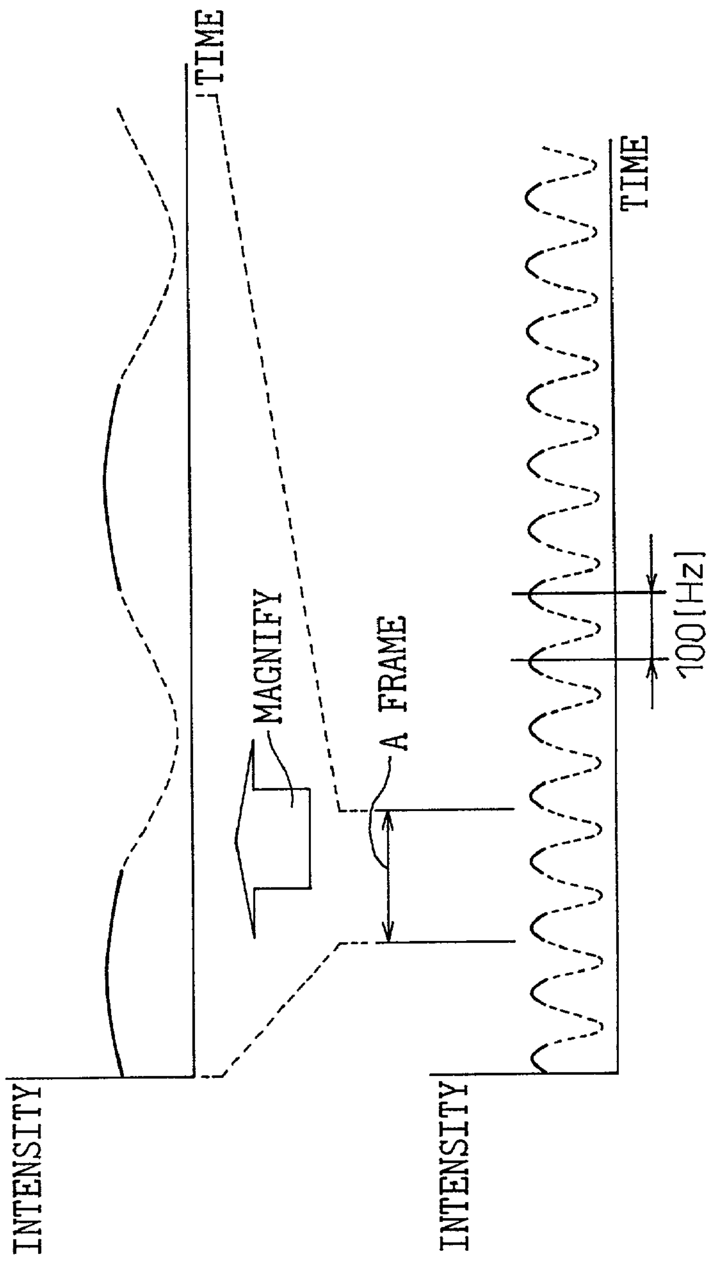
Figure 8:
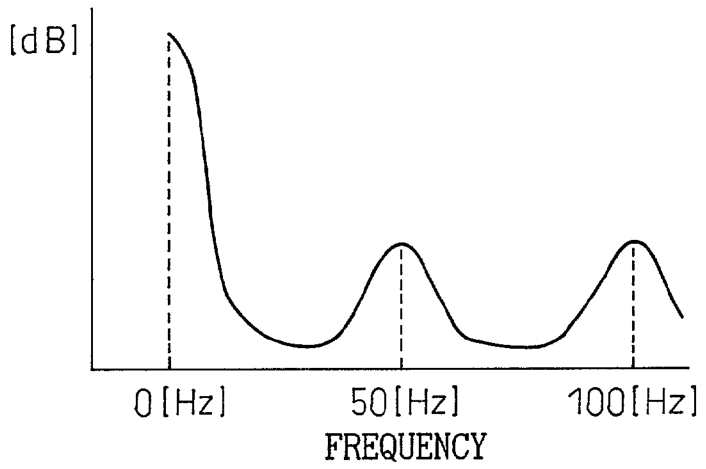
FIG. 8 is a diagram that shows the frequency component of the light emission of the present invention.
Figure 11A:
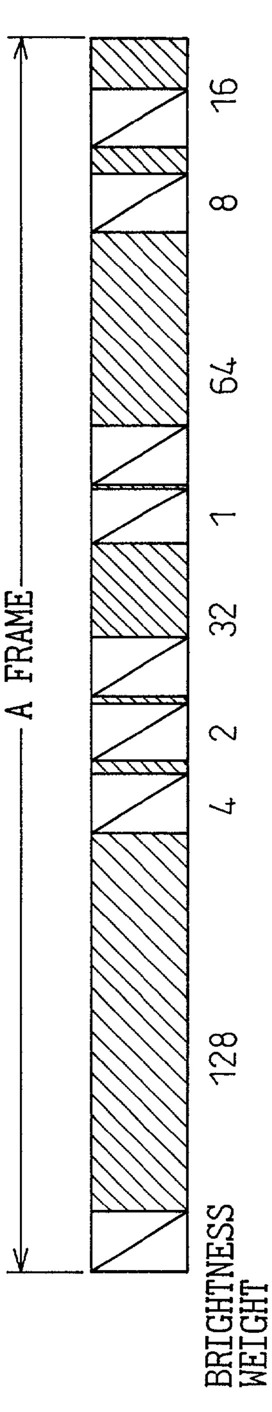
FIG. 11A and FIG. 11B are diagrams that show the frame structure and the variation of the light emission intensity in the second embodiment of the present invention.
Figure 11B:
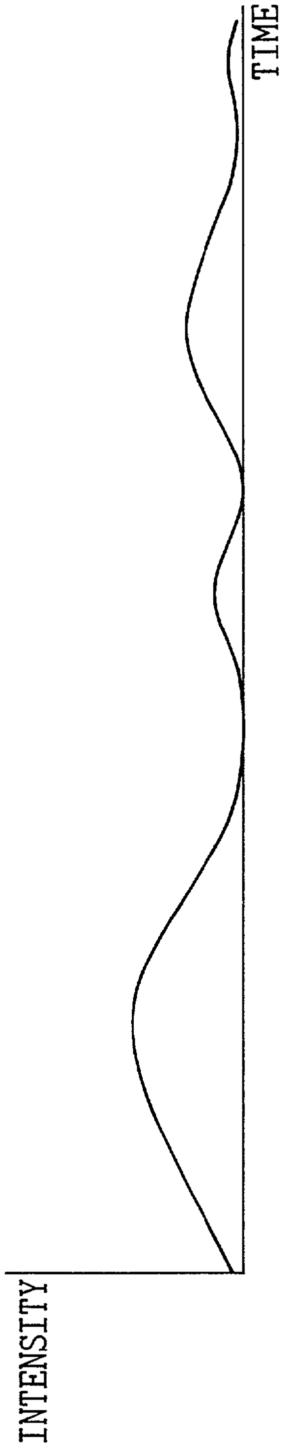

FIG. 11A is a diagram that shows the frame structure and the variation of the light emission intensity of the method of driving the plasma display apparatus in the second embodiment of the present invention. The frame structure in the second embodiment has a structure in which the arrangement order of subfields in FIG. 6 is changed, the brightness weights of which are powers of 2, and which can represent the greatest number of gradations with a small number of subfields. The variation of the light emission intensity in the frame structure of FIG. 11(A) is shown in FIG. 11B, in which the positions of the two highest peaks are arranged with values of about half the frame length compared to the case with the conventional arrangement order in FIG. 6A, therefore, the component of 50 Hz is lowered and that of 100 Hz, which is not detected by human eyes, increases, resulting in a reduction of flicker.

Figures 12A, 12B, 12C:
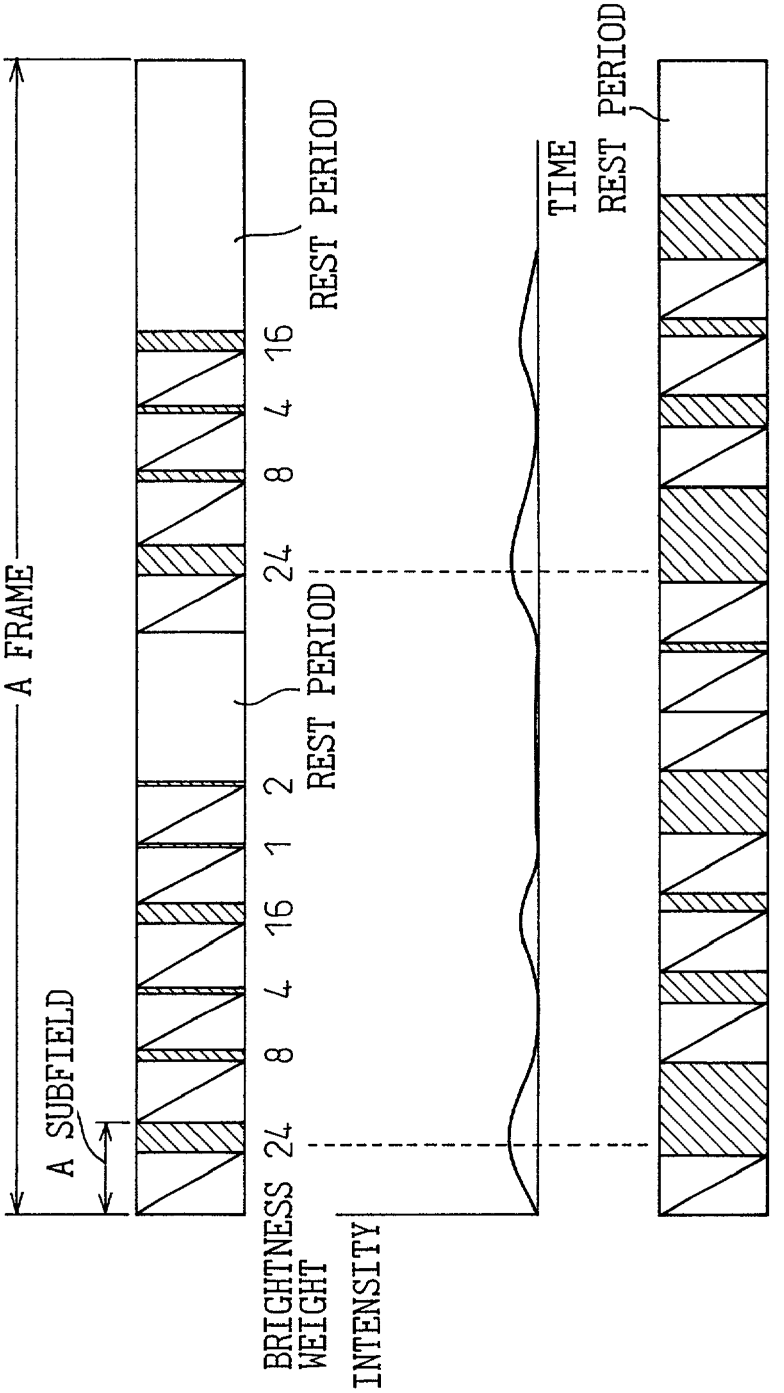
FIG. 12A through FIG. 12C are diagrams that show the frequency components of light emission in the third embodiment.

FIG. 12A is a diagram that shows the frame structure of the method of driving the plasma display apparatus in the third embodiment of the present invention, and FIG. 12B is a diagram that shows the variation of the light emission intensity. The plasma display apparatus in the third embodiment is an example case where the apparatus is driven at the frequency of 50 Hz and the rest period occurs without fail.

In the frame structure in the third embodiment, a total of 10 subfields, that is, subfields of 24, 16, 8, and 4 brightness weight in pairs, respectively, and subfields of 2 and 1 brightness weight each, respectively, are provided and after subfields of 24, 8, 4, 16, 1, and 2 brightness weight are arranged in this order, the first rest period is provided, and then subfields of 24, 8, 4, and 16 brightness weight are arranged in this order and finally, the second rest period is provided. In other words, the rest period is divided into two and arranged between subfields apart from each other. The two subfields of 24 brightness weight are arranged after the rest period (before the previous subfield of 24 brightness weight, there exists the rest period of the previous frame), and when the length of the rest period varies, the lengths of the first and the second rest periods are varied so that the positions of the sustain periods of the two subfields of 24 brightness weight do not change. FIG. 12C shows an example in which the rest period is shortened and in this case, the first rest period is removed and only the second rest period remains.

Therefore, the results of the frequency analysis of the variation of the light emission intensity in the frame structure in the third embodiment are almost the same as those in the first embodiment as shown in FIG. 10.

Figures 13A, 13B, 13C:
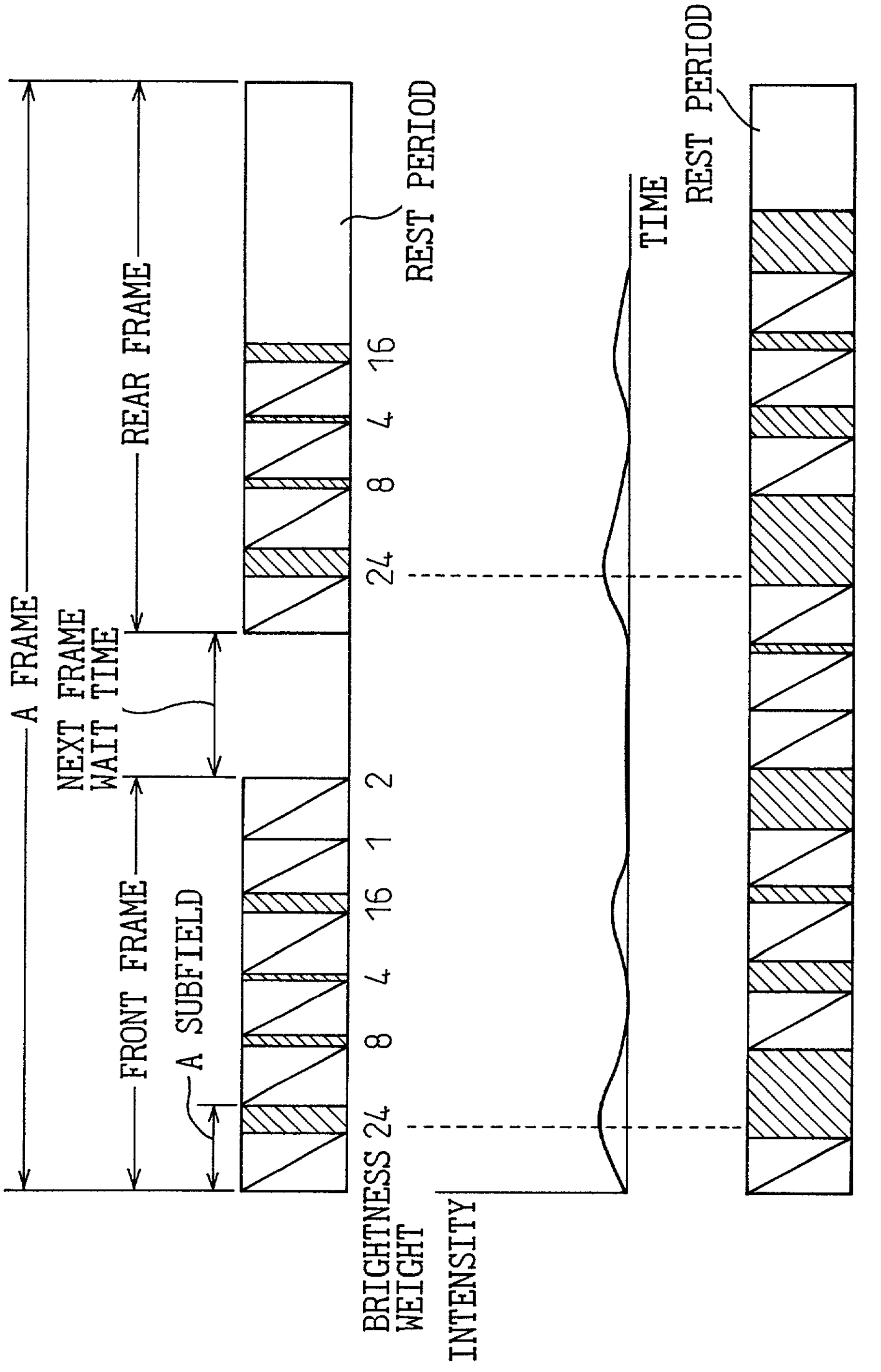
FIG. 13A through FIG. 13C are diagrams that show the frame structures and the variation of the light emission intensity in the fourth embodiment.

FIG. 13A is a diagram that shows the frame structure of the method of driving the plasma display apparatus in the fourth embodiment of the present invention, and FIG. 13B is a diagram that shows the variation of the light emission intensity. The plasma display apparatus in the fourth embodiment has almost the same structure as that in the third embodiment, but the control method is different. In the fourth embodiment, a frame is divided into the front frame portion and the rear frame portion, and in the front frame portion, six subfields of 24, 16, 8, 4, 1 and 2 brightness weight are provided in this order, four subfields of 24, 16, 8, and 4 brightness weight are provided in the rear frame portion in this order, and the rest period is also provided. A next frame wait time is provided between the front frame portion and the rear frame portion. In the fourth embodiment, a signal, the period of which is half the length of the frame, is generated from the Vsync signal and this signal controls the start timings of the front and the rear frame portions. Therefore, the start timings of the front frame portion and the rear frame portion are fixed. When the sustain time of each subfield is varied because of the brightness adjustment, and so on, the "next frame wait time" and the length of the "rest period" in the rear frame portion are adjusted. Therefore, the sustain periods of the two subfields of 24 brightness weight are not changed in position even if the sustain time of each subfield is varied.

FIG. 13C shows an example when the rest period is shortened, and in this case the next frame wait time is removed and only the rest period in the rear frame exists.

Therefore, the results of the frequency analysis of the variation of the light emission intensity in the frame structure in the third embodiment are almost the same as those in the first embodiment as shown in FIG. 10.

Figures 14A, 14B, 14C:
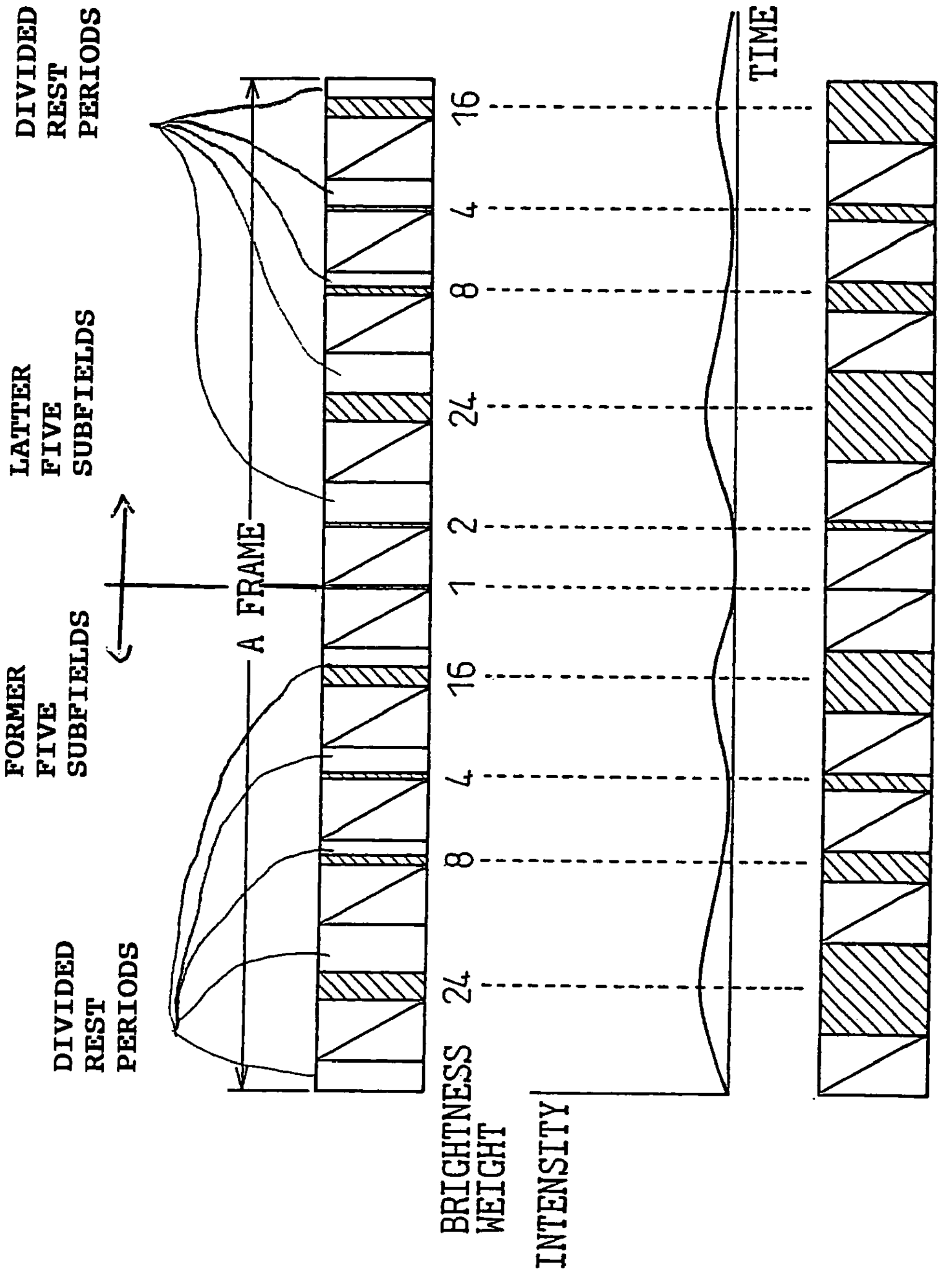
FIG. 14A through FIG. 14C are diagrams that show the frame structures and the variation of the light emission intensity in the fifth embodiment.

FIG. 14A is a diagram that shows the frame structure of the method of driving the plasma display apparatus in the fifth embodiment of the present invention, FIG. 14B is a diagram that shows the variation of the light emission intensity, and FIG. 14C is a diagram that shows the frame structure when there is no rest period. In the frame structure in the fifth embodiment, a total of 10 subfields, that is, subfields of 24, 16, 8, and 4 brightness weight in pairs, respectively, and subfields of 2 and 1 brightness weight each, respectively, are provided and arranged in the order of subfields of 24, 8, 4, 16, 1, 2, 24, 8, 4, and 16 brightness weight. The rest period is divided into ten divided rest periods in correspondence to the subfields. In the former five subfields, the divided rest period is provided at the front portion of the corresponding subfield, and the divided rest period is provided at the rear portion of the corresponding subfield in the latter five subfields, and the length of each rest period is adjusted so that the center position of the sustain period of each subfield is not changed when the length of the rest period of the entire frame is varied. Therefore, the frame structure is as shown in FIG. 14C when the rest period of the entire frame does not exist. In the fifth embodiment, the light emission intensity varies as shown in FIG. 14C, and the way the intensity varies is almost constant even if the length of the rest period is varied and only the absolute value of the intensity varies.

Therefore, the results of the frequency analysis of the variation of the light emission intensity in the frame structure in the fifth embodiment are almost the same as those in the first embodiment as shown in FIG. 10.

Figures 15A, 15B:
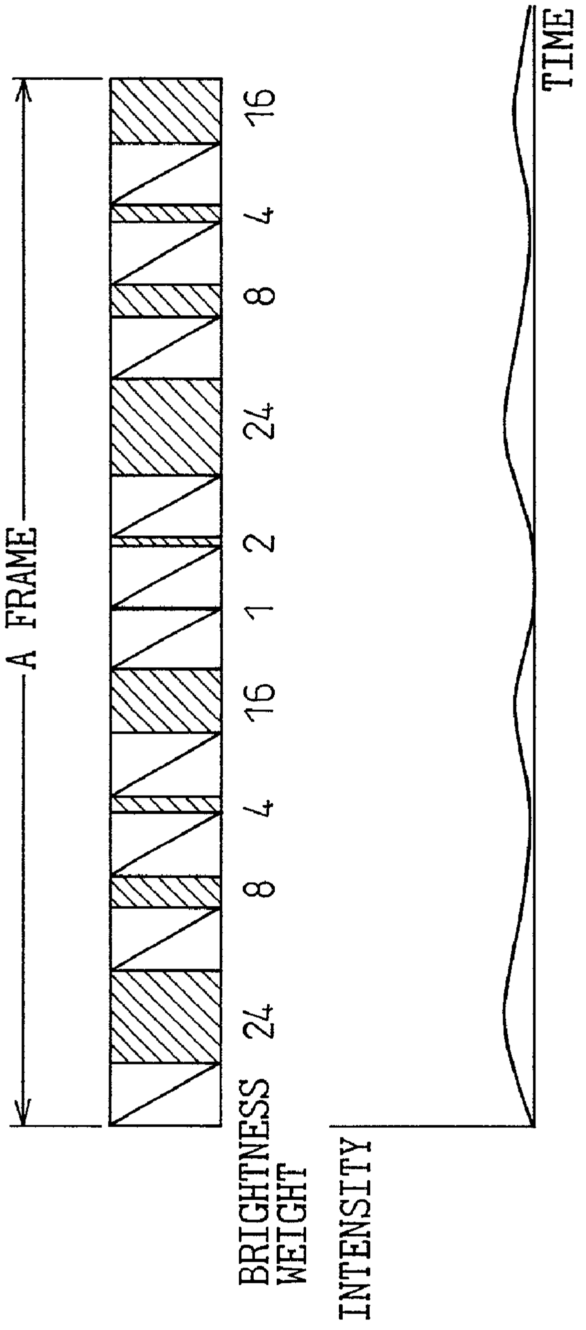
FIG. 15A and FIG. 15B are diagrams that show the frame structure and the variation of the light emission intensity in the sixth embodiment.

FIG. 15A is a diagram that shows the frame structure of the method of driving the plasma display apparatus in the sixth embodiment of the present invention, and FIG. 15B is a diagram that shows the variation of the light emission intensity. In the frame structure in the sixth embodiment, a total of 10 subfields, that is, subfields of 24, 16, 8, and 4 brightness weight in pairs, respectively, and subfields of 2 and 1 brightness weight each, respectively, are provided and arranged in the order of subfields of 24, 8, 4, 16, 1, 2, 24, 8, 4, and 16 brightness weight. When the number of sustain pulses in the entire frame is varied, the period of the sustain pulse is varied so that the length of the sustain period does not vary. For example, when the number of sustain pulses in the entire frame is reduced by 20%, the length of the sustain period is lengthened by a factor of 1.25, and when the number of sustain pulses is halved, the length of the period of the sustain pulse is doubled, and so on. Therefore, in the sixth embodiment, the position of the sustain period of each subfield does not change. In the sixth embodiment, the light emission intensity varies as shown in FIG. 15B, and the way the intensity varies is almost fixed even if the number of sustain pulses is varied, and only the absolute value of the intensity varies.

Therefore, the results of the frequency analysis of the variation of the light emission intensity in the frame structure in the sixth embodiment are almost the same as those in the first embodiment as shown in FIG. 10.

Figure 1:
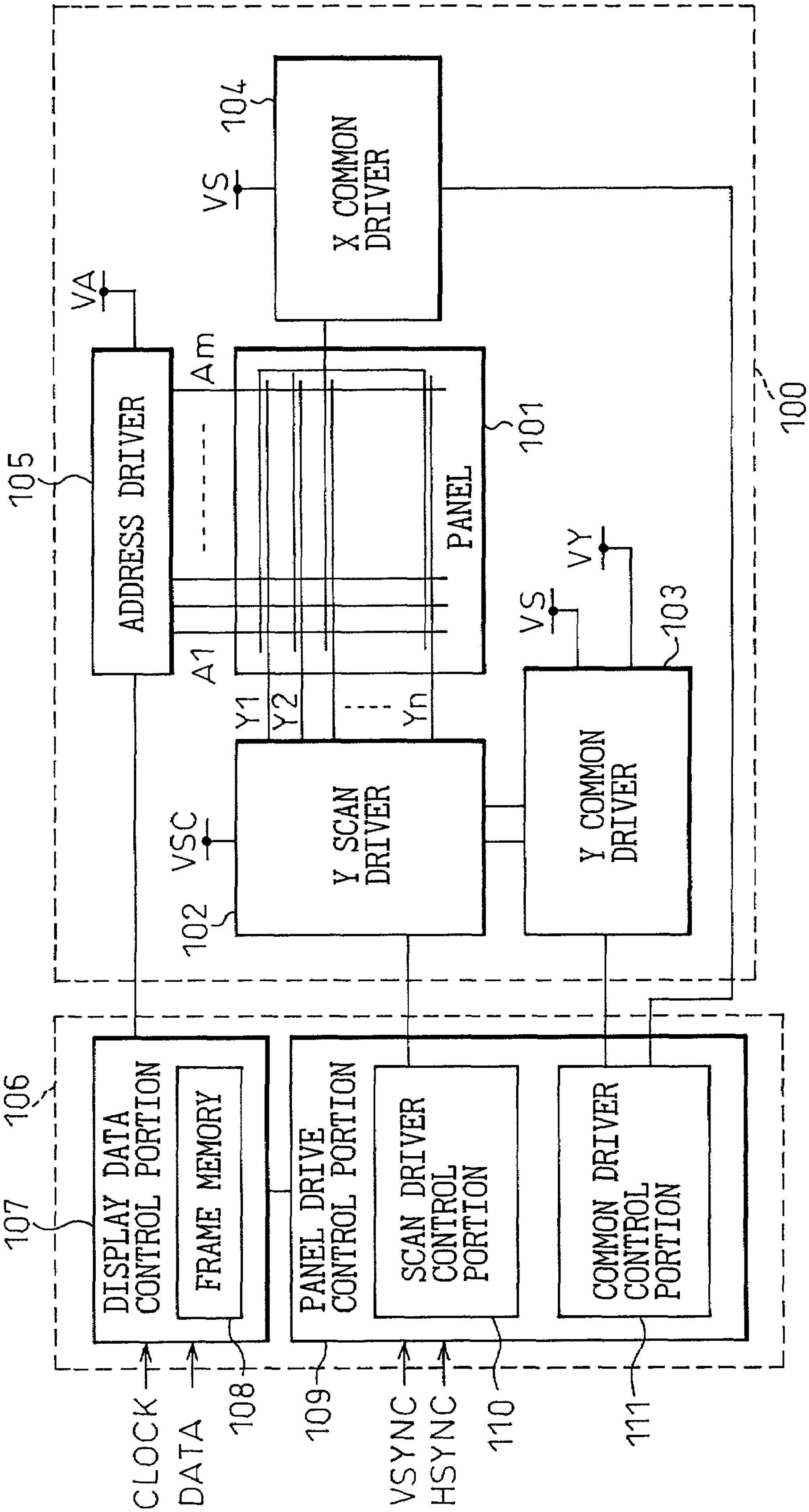
FIG. 1 is a diagram that shows the structure of the drive circuit of the plasma display apparatus (PDP apparatus).
Figure 2:
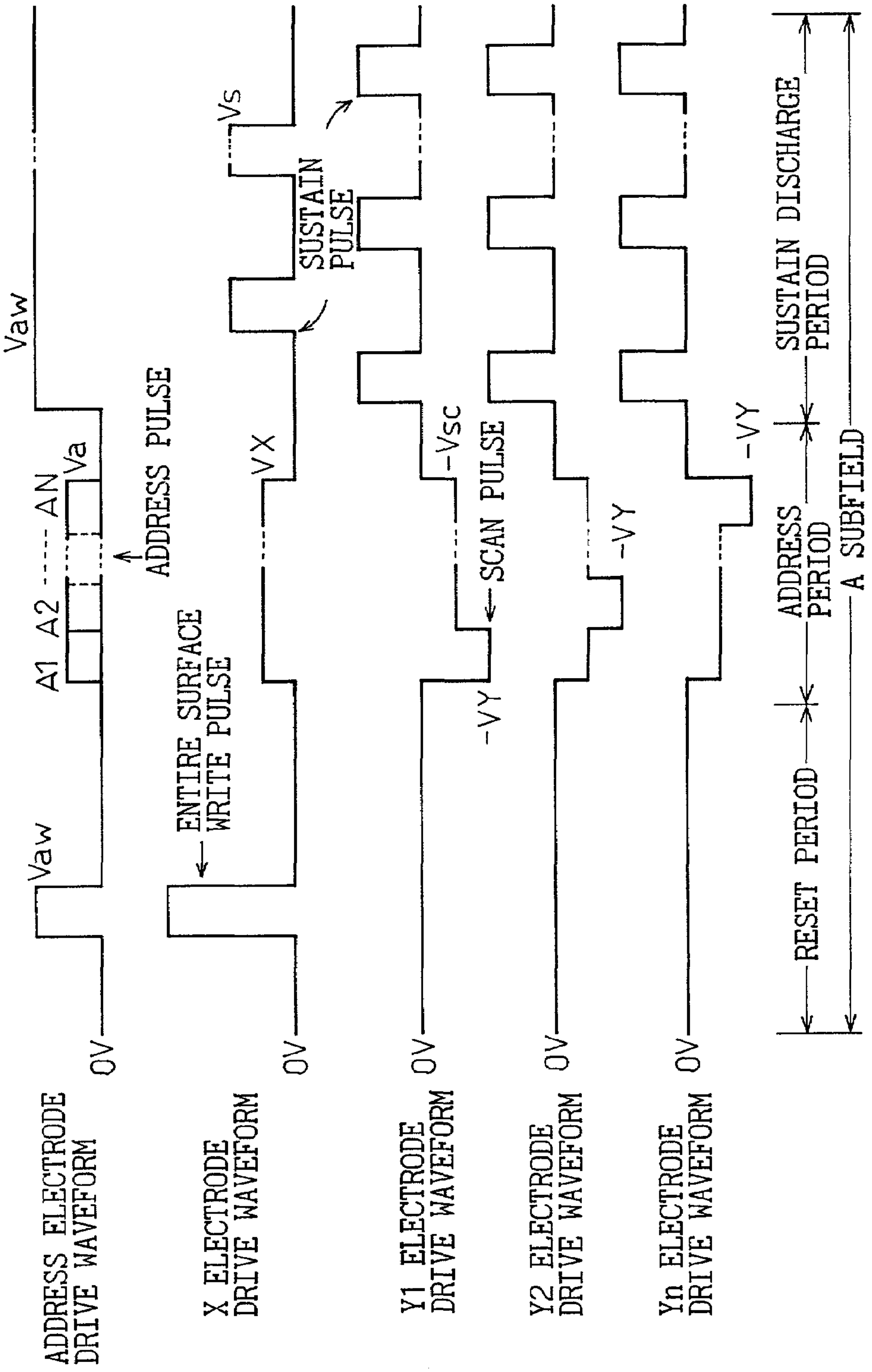
FIG. 2 is a time chart that shows the drive waveforms of the plasma display apparatus (PDP apparatus).
Figure 3:
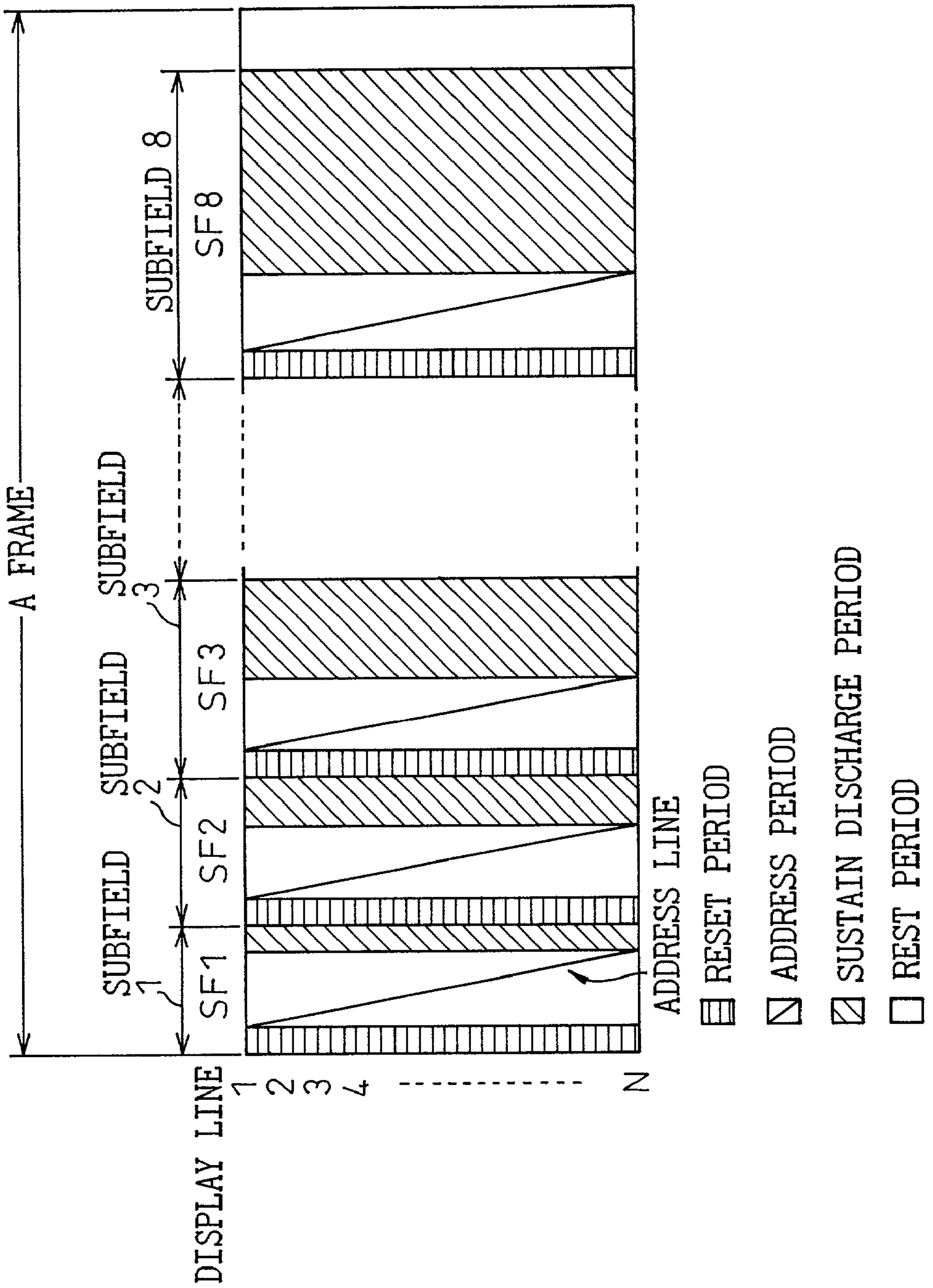
FIG. 3 is a time chart of the address/sustain discharge separated type-address method for the gradation scales in the plasma display apparatus (PDP apparatus).
Figure 16:
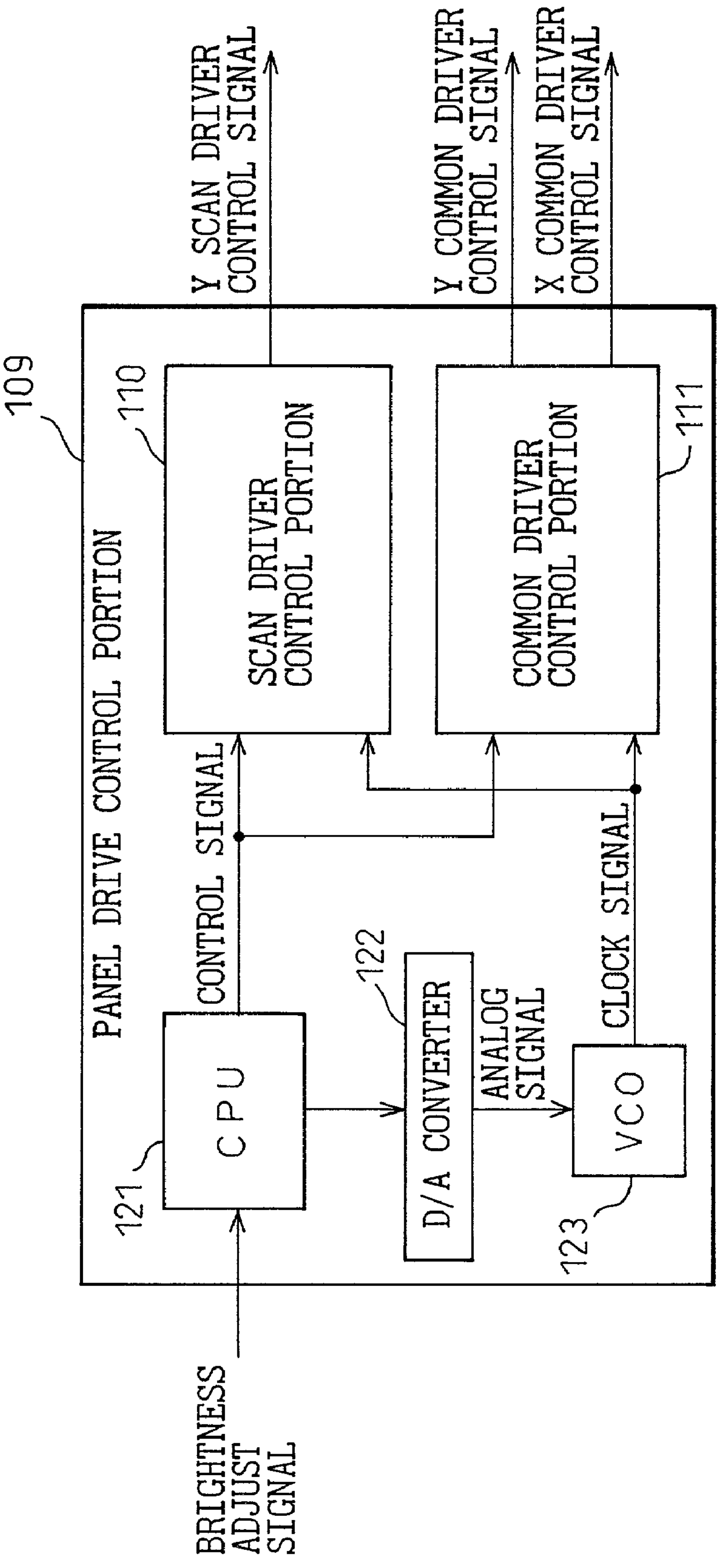
FIG. 16 is a diagram that shows the structure of the panel drive control portion in the sixth embodiment.

In order to realize the driving method in the sixth embodiment, the panel drive control portion 109 in the drive circuit of the PDP apparatus in FIG. 1 is made to have a structure as shown in FIG. 16 so that the period of the sustain pulse can be varied. In the panel drive control portion 109, a CPU 121 controls the number of sustain pulses of each subfield according to the brightness adjust signal entered from the outside, the internal power control, and so on. The sustain period of each subfield is constant and the CPU 121 determines the period (frequency) of the sustain pulse based on the number of sustain pulses of each subfield and the length of the sustain period, generates the corresponding control data, and puts out to a D/A converter 122. The D/A converter 122 generates analog signals corresponding to the control data and applies it to a VCO 123. The VCO 123 generates clocks of a frequency corresponding to these analog signals (termed "an original clock frequency"), and supplies them to a scan driver control portion 110 and a common driver control portion 111. In this way, the clock period is varied.

The period of the clock thus generated determines the basic period of the control signal output of the scan driver control portion 110 and the common driver control portion 111, and the output period of the Y scan driver control signal and the X/Y common driver control signal is varied by varying the clock period.

Figure 17:
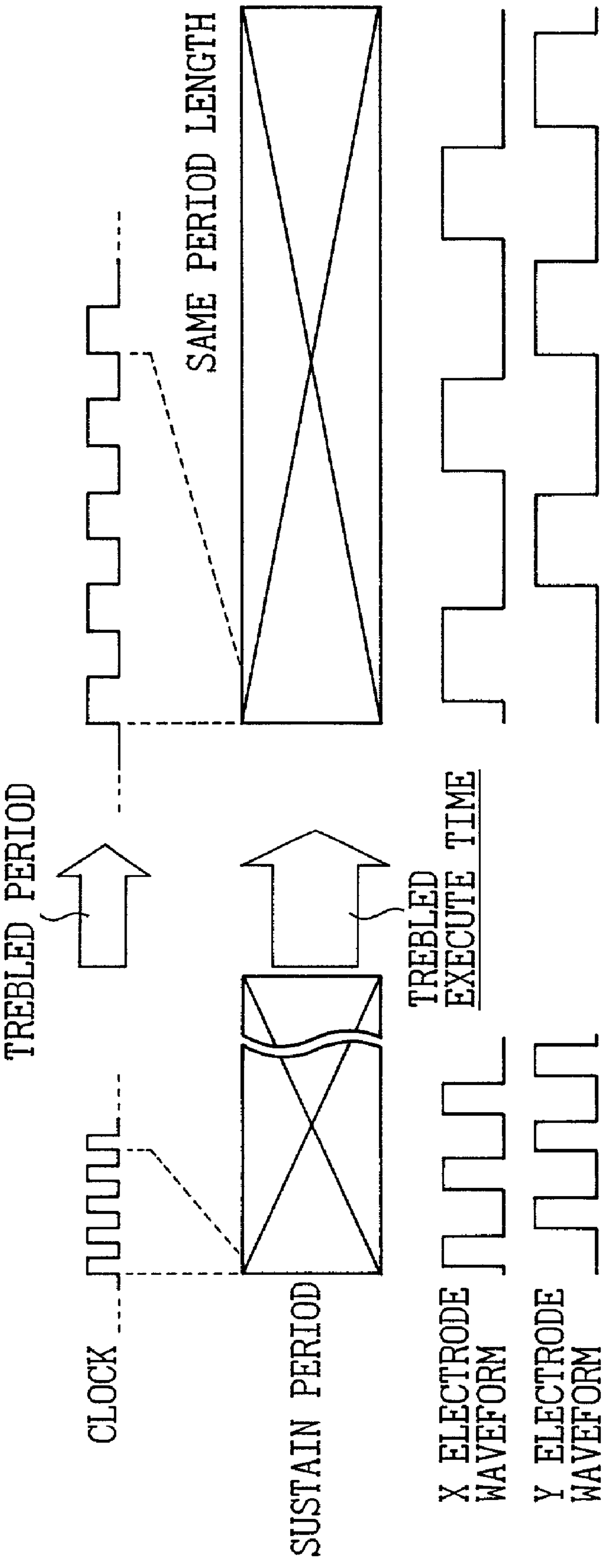
FIG. 17 is a diagram that describes the variation in frequency of the sustain pulse period in the sixth embodiment.

FIG. 17 is a diagram that describes the variation of the sustain pulse period in the sixth embodiment, and also shows a case where the period of the clock signal in the sustain period is multiplied by a factor 3. In order to reduce the number of sustain pulses to one third, the period of the clock signal in the sustain period is trebled. In accordance with this, the execute time required to generate the sustain pulses to be applied to the X electrodes and the Y electrodes is also trebled and the period of the sustain pulse is trebled. The length of the sustain period, however, is the same therefore the number of sustain pulses generated in the sustain period is reduced to one third. It is possible in this way to vary the number of sustain pulses while keeping the length of the sustain period constant. Therefore, the position of the sustain period of each subfield does not change even when the number of sustain pulses is varied, the way the light emission intensity varies in a frame is constant, and only the absolute value varies.

Figure 18:
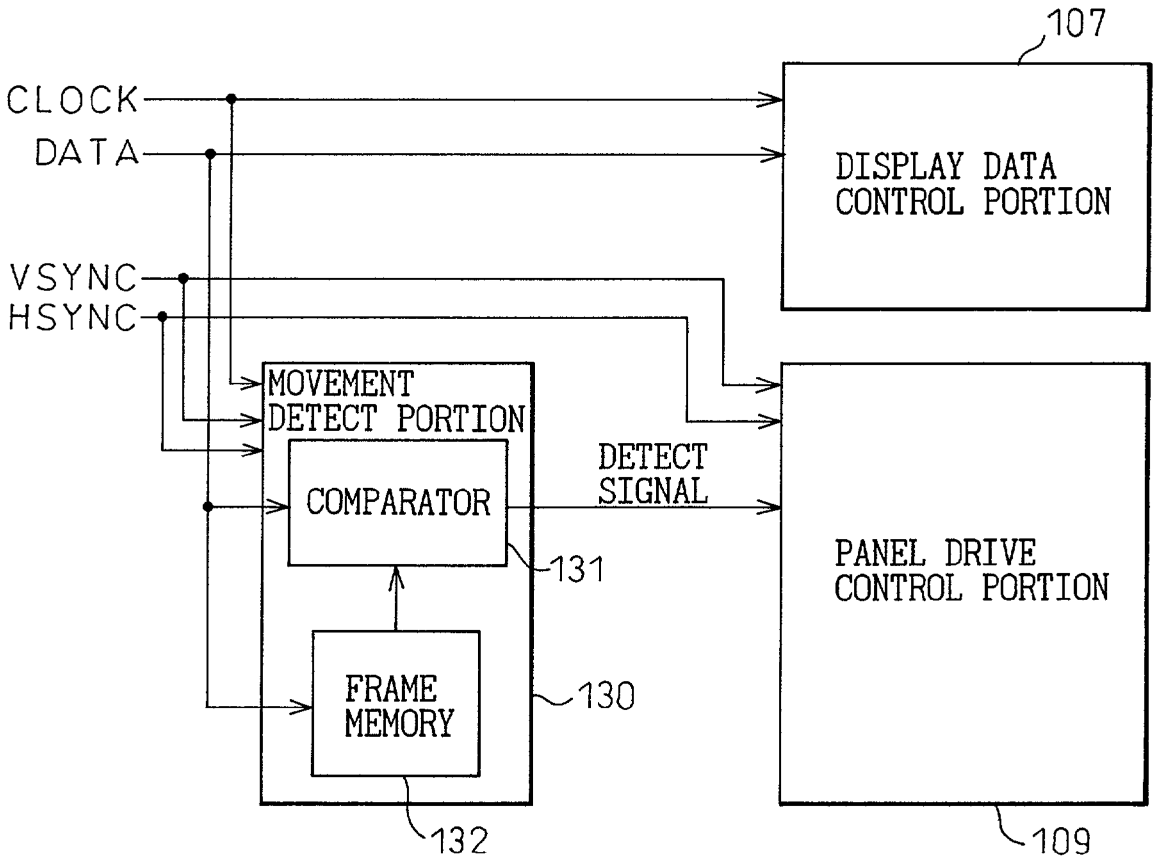
FIG. 18 is a diagram that shows the structure of the control circuit in the seventh embodiment of the present invention.

FIG. 18 is a block diagram that shows the structure of the control circuit to carry out the method of driving the plasma display apparatus in the seventh embodiment of the present invention. In the seventh embodiment, a movement detect portion 130 is provided in the control circuit 106 in the drive circuit of the PDP apparatus in FIG. 1, as shown in FIG. 18. The movement detect portion 130 comprises a frame memory 132 and a comparator 131 that compares the display data of the previous frame stored in the frame memory and that of the frame to be displayed next for each cell. The frame memory 132 can be used instead of the frame memory 108 provided in the display data control portion 107.

In the case of the still images, the display data varies slightly between the previous frame and the next frame, but it varies considerably in the case of non-still images such as animation. Therefore, the images are judged as still images when the difference is small and non-sill images when the difference is large, and the judgment result is put out to the panel drive control portion 109 as detect signals.

Figure 4A:
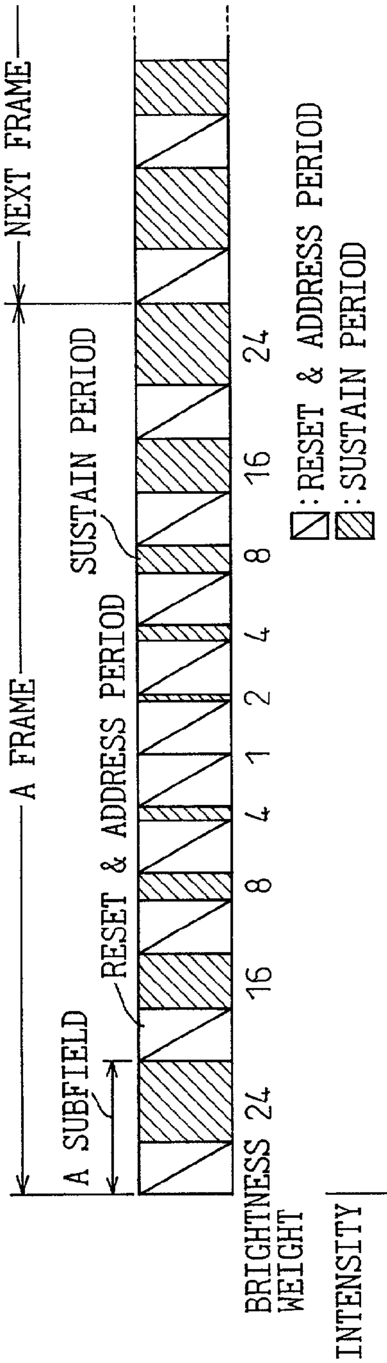
FIG. 4A and FIG. 4B are diagrams that show the conventional frame structure of the plasma display apparatus (PDP apparatus) and the variation of the light emission intensity when driven at a frequency of 50 Hz.
Figure 4B:
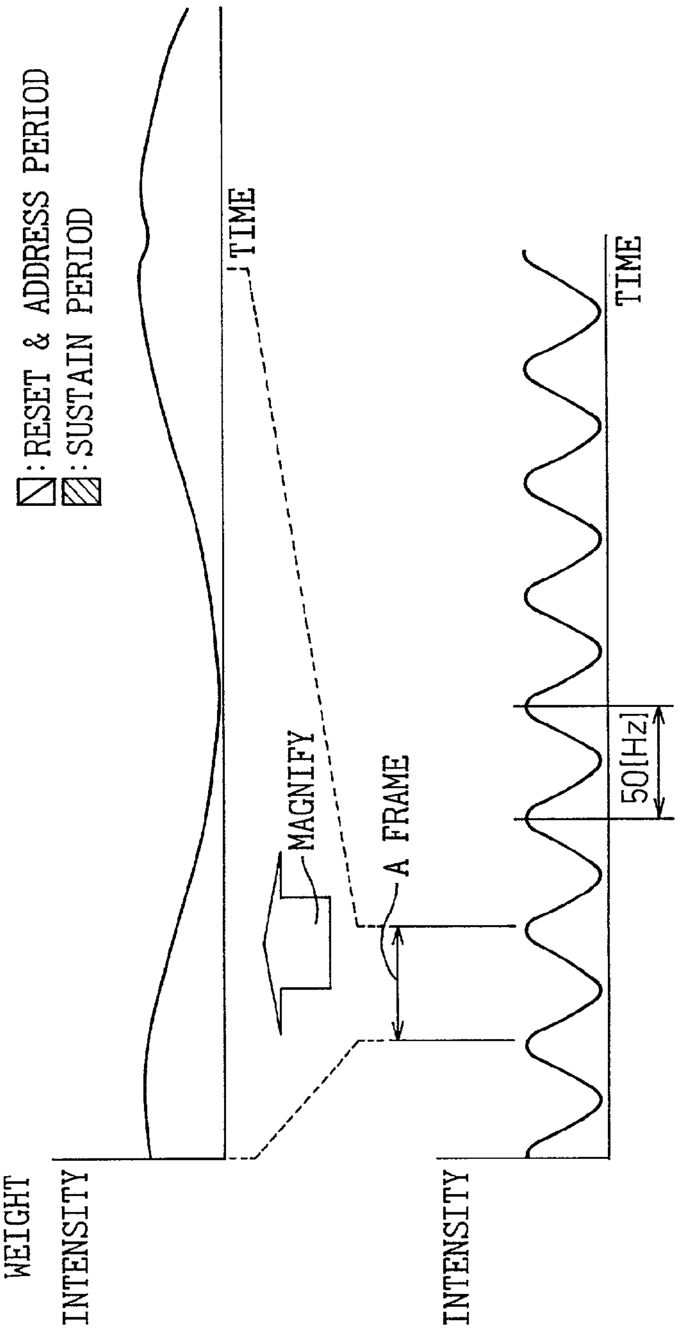
Figure 5:
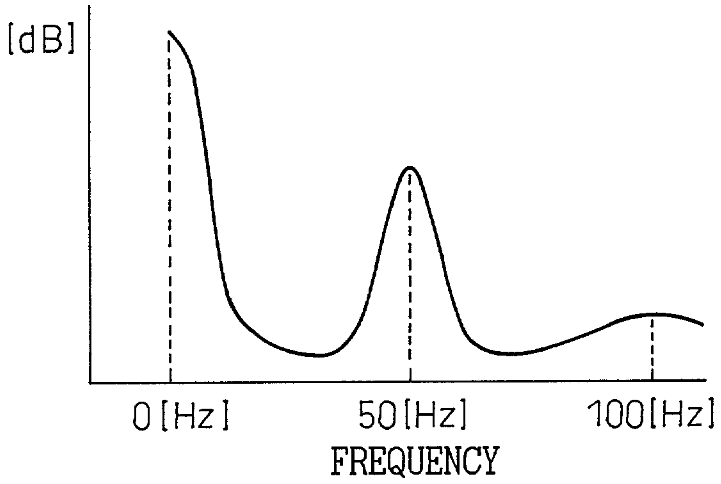
FIG. 5 is a diagram that shows the frequency component of the light emission in the frame structure in FIG. 4.
Figure 19:
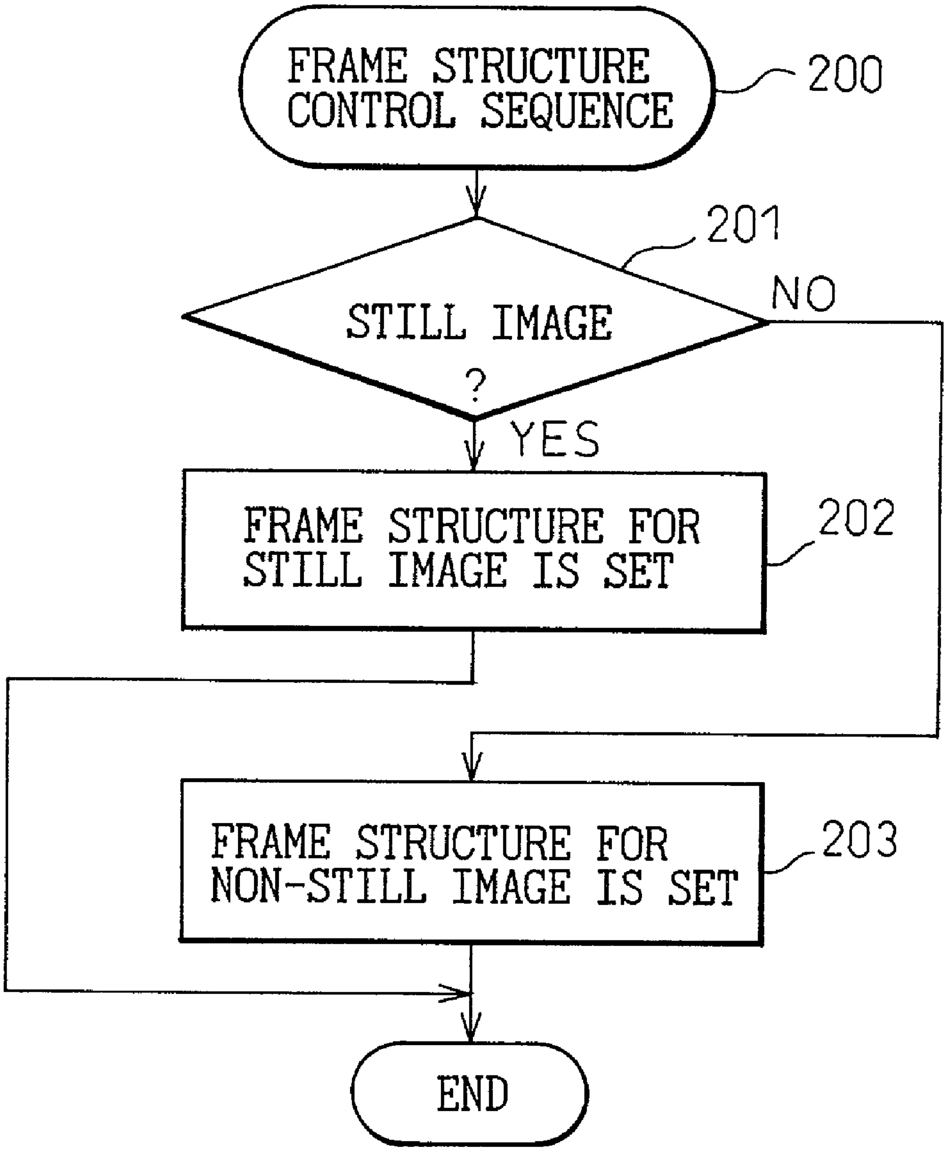
FIG. 19 is a flow chart that shows the control sequence in the seventh embodiment.

FIG. 19 is a flow chart that shows the frame structure control sequence in the panel drive control portion 109. In step 201, whether the images are still images or not is judged from the detect signals. When judged as still images, the frame structure for the still images is set in step 202. The frame structure for still images has, for example, the frame structure in the first embodiment as shown in FIG. 9. On the other hand, when judged as non-still images such as animation, the frame structure for the non-still images as shown in FIG. 4 is set in step 203.

As described previously, it is impossible to improve every item relating to the image quality with a limited number of subfields, but it is possible to display images of good quality constantly in the seventh embodiment because a proper frame structure is employed according to the types of images to be displayed.

As described above, according to the present invention, the occurrence of flicker can be suppressed even when the plasma display apparatus of the subfield method is driven at a frequency of 50 Hz. Moreover, when the number of sustain pulses is varied because of the power control, and so on, the quality of image is not degraded because the position of the sustain period, that is, the light emission period, of each subfield does not change. Furthermore, it is possible to display images of good quality constantly regardless of the image types.

We claim:

1. A method of driving a display apparatus, in which a frame comprises n subfields, each subfield has at least an address period to select cells to be displayed and a light period to light the selected cells, and a gradation scale is represented by combining the subfields to be lit among said plural subfields, wherein subfields of Bn brightness and Bn−1 brightness, when a brightness of said n subfields is assumed to be Bi (i=1−n; B1≦B2 . . . Bn−1≦Bn), are arranged at an interval of about half a length of said frame, wherein subfields of Bn−2 brightness and Bn−3 brightness among said n subfields are arranged at the interval of about half the length of said frame so that each of the subfields of the Bn−2 brightness and the Bn−3 brightness is positioned almost at a midpoint between two most brightness-weighted subfields.

2. The method of driving a display apparatus, as set forth in claim 1, wherein when a length of a rest period in said frame is greater than a predetermined value, said frame includes at least two divided rest periods which are obtained by dividing said rest period.

3. The method of driving a display apparatus as set forth in claim 2, wherein said rest period is divided in correspondence with said plural subfield so that a number of the divided rest periods is equal to that of said plural subfields and each divided rest period is arranged in correspondence with the corresponding subfield.

4. A method of driving a display apparatus, in which a frame comprises n subfields, each subfield has at least an address period to select cells to be displayed and a light period to light the selected cells, and a gradation scale is represented by combining the subfields to be lit among said plural subfields, wherein subfields of Bn brightness and Bn−1 brightness, when a brightness of said n subfields is assumed to be Bi (i=1−n; B1≦B2 . . . Bn−1≦Bn), are arranged at an interval of about half a length of said frame, wherein the brightness of each subfield is determined by a number of lit pulses in said light period, and when a total number of sustain pulses in the frame is varied, an original clock frequency, which generates an execute signal at least either in said address period or in said light period, is varied.

5. The method of driving a display apparatus as set forth in claim 1, wherein only the original clock frequency, to generate the execute signal in said light period, is varied to vary a period of sustain pulses to be applied in said light period.

6. A method of driving a display apparatus, in which a frame comprises plural subfields, each subfield has at least an address period to select cells to be displayed and a light period to light the selected cells, and a gradation scale is represented by combining the subfields to be lit among said plural subfields, wherein when a total number of sustain pulses in the frame is varied, an original clock frequency, which generates an execute signal at least either in said address period or said light period, is varied.

7. The method of driving a display apparatus as set forth in claim 6, wherein only the original clock frequency, to generate the execute signal in said light period, is varied to vary a period of sustain pulses to be applied in said light period.

8. A display apparatus displaying a gradation scale by a subfield method in which a frame comprises n subfields, each subfield has at least an address period to select cells to be displayed and a light period to light the selected cells, and the gradation scale is represented by combining subfields to be lit among said n subfields such that subfields of Bn brightness and Bn−1 brightness, when a brightness of said n subfields is assumed to be Bi (i=1−n; B1≦B2 . . . Bn−1≦Bn), are arranged at an interval of about half a length of said frame, wherein subfields of Bn−2 brightness and Bn−3 brightness among said n subfields are arranged at the interval of about half the length of said frame so that each of the subfields of the Bn−2 brightness and the Bn−3 brightness is positioned almost at a midpoint between two most brightness-weighted subfields.

9. The display apparatus as set forth in claim 8, wherein when a length of a rest period in said frame is greater than a predetermined value, said frame includes at least two divided rest periods which are obtained by dividing said rest period.

10. The display apparatus as set forth in claim 9, wherein, said rest period is divided in correspondence with said plural subfields so that a number of the divided rest periods is equal to that of said plural subfields and each divided rest period is arranged in correspondence with the corresponding subfield.

11. A display apparatus displaying a gradation scale by a subfield method in which a frame comprises n subfields, each subfield has at least an address period to select cells to be displayed and a light period to light the selected cells, and the gradation scale is represented by combining subfields to be lit among said n subfields such that subfields of Bn brightness and Bn−1 brightness, when a brightness of said n subfields is assumed to be Bi (i=1−n; B1≦B2, . . . Bn−1≦Bn), are arranged at an interval of about half a length of said frame, wherein the brightness of each subfield is determined by a number of sustain pulses in said light period, and when a total number of lit pulses in the frame is varied, an original clock frequency, which generates an execute signal at least either in said address period or in said light period, is varied.

12. The display apparatus as set forth in claim 11, wherein only the original clock frequency, to generate the execute signal in said light period, is varied to vary a period of sustain pulses to be applied in said light period.

13. A display apparatus displaying a gradation scale by a subfield method in which a frame comprises plural subfields, each subfield has at least an address period to select cells to be displayed and a light period to light the selected cells, and the gradation scale is represented by combining subfields to be lit among said plural subfields such that when a total number of sustain pulses in the frame is varied, an original clock frequency, which generates an execute signal at least either in said address period or said light period, is varied.

14. The display apparatus as set forth in claim 13, wherein, only the original clock frequency to generate the execute signal in said light period is varied to vary a period of sustain pulses to be applied in said light period.

* * * * *

UNITED STATES PATENT AND TRADEMARK OFFICE

CERTIFICATE OF CORRECTION

PATENT NO. : 7,126,617 B2
APPLICATION NO. : 09/985780
DATED : October 24, 2006
INVENTOR(S) : Akira Yamamoto et al.

It is certified that error appears in the above-identified patent and that said Letters Patent is hereby corrected as shown below:

Column 12, line 9, change "claim 1" to --claim 4--

Column 12, line 60, change "$B1 \leqq B2$," to --$B1 \leqq B2$--

Signed and Sealed this

Sixth Day of March, 2007

JON W. DUDAS

*Director of the United States Patent and Trademark Office*